April 11, 1961  D. O. BISHOP ET AL  2,979,630
TRANSMISSION MECHANISMS AND THE LIKE
Filed April 12, 1957  6 Sheets-Sheet 1
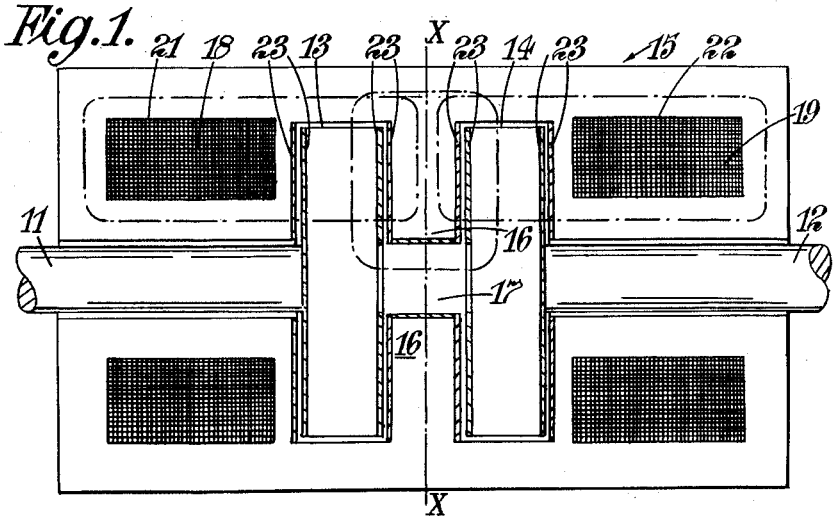
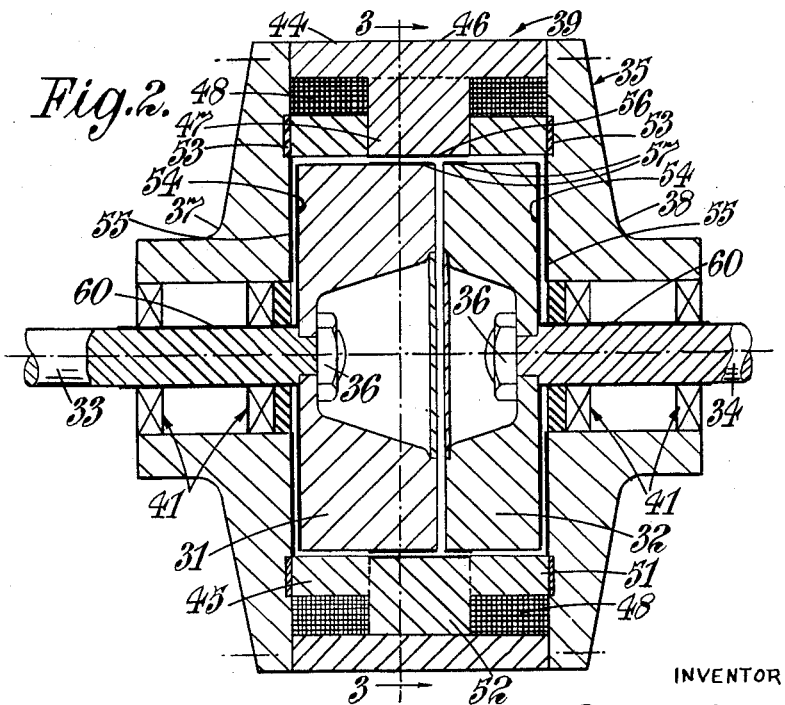
INVENTORS
DUDLEY O. BISHOP
GEORGE S. BROSAN
By Watson, Cole, Grindle & Watson
ATTORNEYS April 11, 1961 D. O. BISHOP ET AL 2,979,630
TRANSMISSION MECHANISMS AND THE LIKE
Filed April 12, 1957 6 Sheets-Sheet 2

INVENTORS
Dudley O. Bishop and
George S. Brosan
By
Watson, Cole, Grindle & Watson
ATTORNEYS April 11, 1961　　　D. O. BISHOP ET AL　　　2,979,630
TRANSMISSION MECHANISMS AND THE LIKE
Filed April 12, 1957　　　　　　　　　　　　6 Sheets-Sheet 3
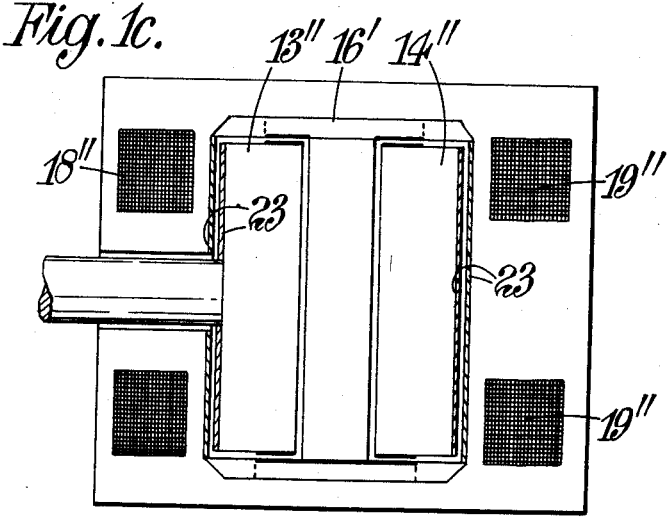
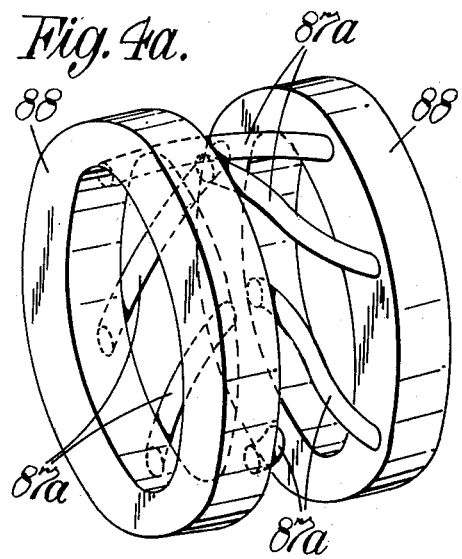
INVENTORS
Dudley O. Bishop and
George S. Brosan
BY
Watson, Cole, Grindle & Watson
ATTORNEYS April 11, 1961  D. O. BISHOP ET AL  2,979,630
TRANSMISSION MECHANISMS AND THE LIKE
Filed April 12, 1957  6 Sheets-Sheet 4
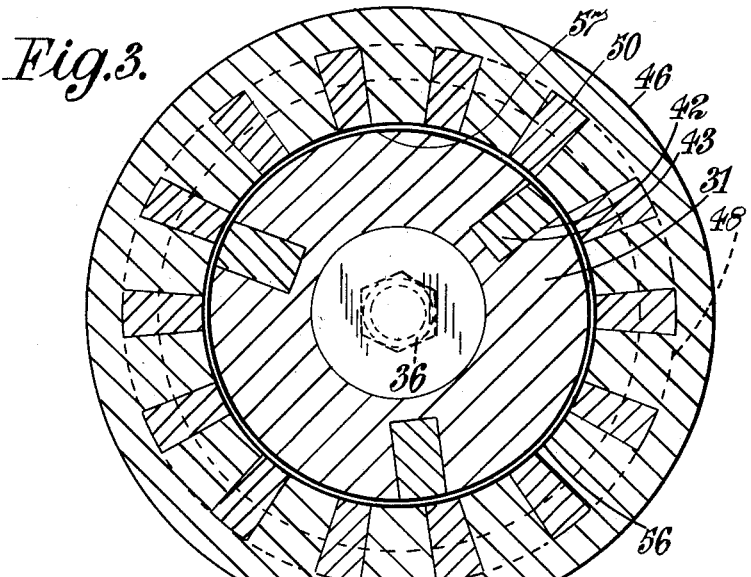
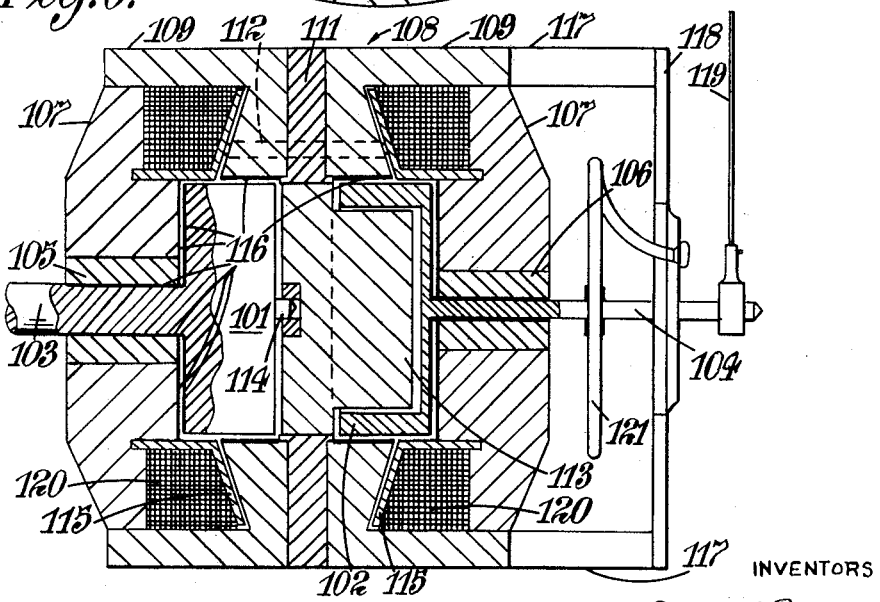
INVENTORS
DUDLEY O. BISHOP
GEORGE S. BROSAN
By
Watson, Cole, Grindle & Watson
ATTORNEYS

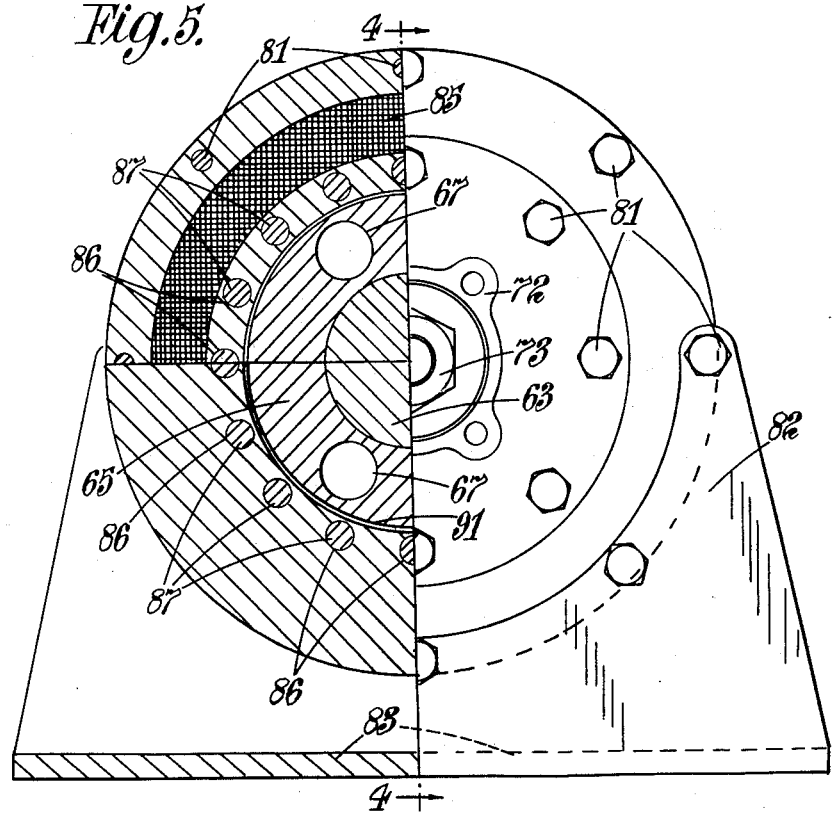

United States Patent Office 2,979,630
Patented Apr. 11, 1961

2,979,630

TRANSMISSION MECHANISMS AND THE LIKE

Dudley Oswald Bishop, 12 Austyn Gardens, Tolworth, Surbiton, and George Stephen Brosan, 25 Holly Lane W., Banstead, England Filed Apr. 12, 1957, Ser. No. 652,384

Claims priority, application Great Britain Apr. 16, 1956

7 Claims. (Cl. 310—102)

The invention relates to transmission mechanisms or like devices and it is an object of the invention to provide an improved transmission mechanism or like device.

The invention provides a transmission mechanism or like device comprising a first member to be driven by the input to the device, when in use, means for producing a magnetic flux through at least part of the said first member so that when that member is driven an electric current is induced therein, a second member to provide the output from the device, means for producing an electric circuit between said two members whereby at least part of the said current induced in the first member is caused to flow through the second member, and means for producing a second magnetic flux through at least part of the said second member, the arrangement being such that the said current flow therein causes or tends to cause movement of the second member.

Preferably, the construction and arrangement of the device is such that the magnitude of the induced current flowing through the second member may be varied, and/or such that the magnitude of the magnetic flux linked with the induced current flowing through the second member may be varied, whereby the velocity ratio of the device may be varied.

Figure 1A:
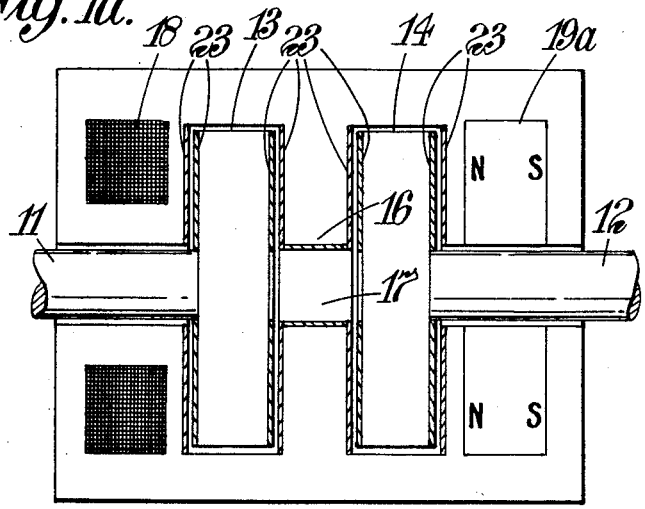
Figure 1B:
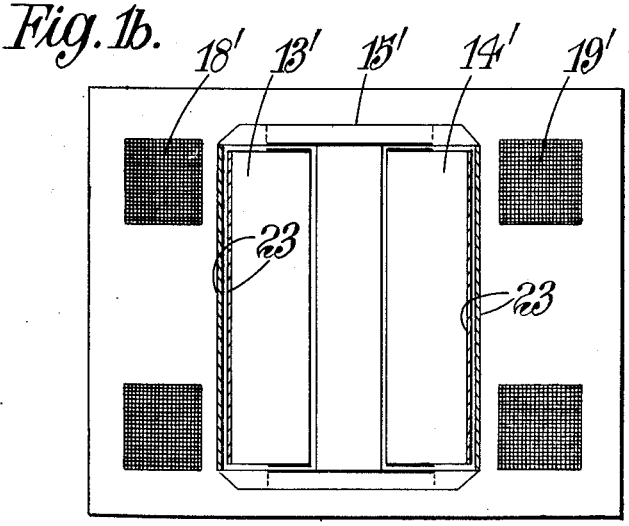
Figure 4:
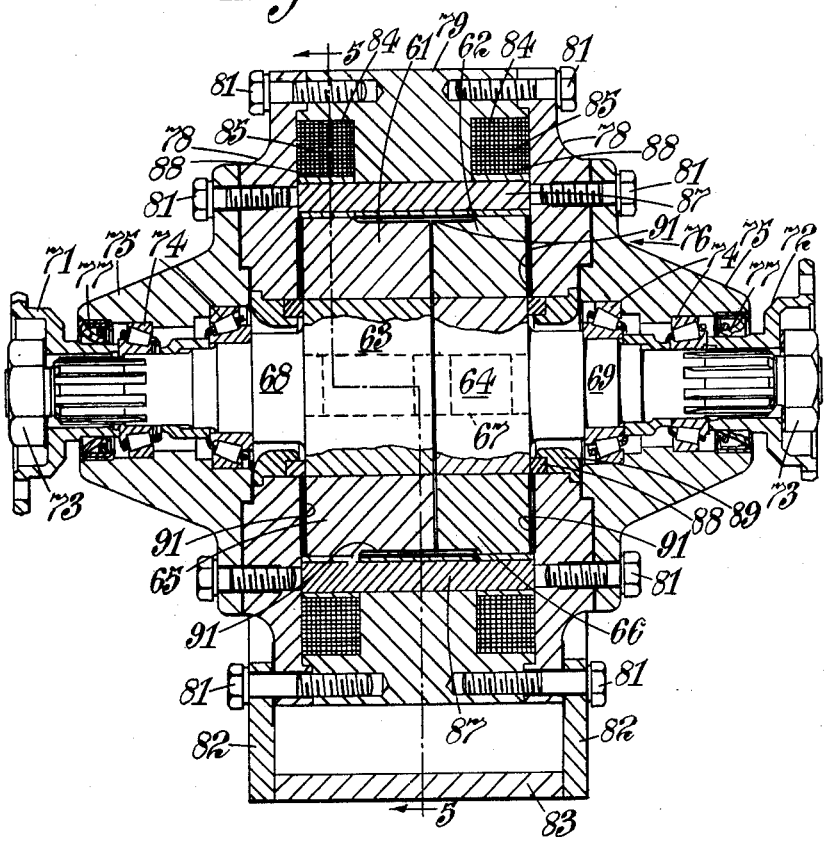

Four specific examples of devices in accordance with the invention will now be described by way of example with reference to the accompanying drawings, in which:

Figure 1 illustrates diagrammatically the first device,

Figure 1a is a fragmentary view showing a detailed modification of the first device, Figure 1b illustrates a modified form of the first device, for transmitting linear motion, Figure 1c illustrates yet a further modified form of the first device for converting a rotary motion to a linear motion, Figure 2 is a sectional view taken axially through the second device, Figure 3 is a sectional view taken on the line 3—3 of Figure 2, Figure 4 is a sectional view taken axially through the third device, Figure 4a is a fragmentary view showing a detailed modification of the second device, Figure 5 is a part sectional view taken on the line 5—5 of Figure 4 and a part end elevation viewed from the left in Figure 4, and Figure 6 is a sectional view taken axially through the fourth device.

In the first three examples the device is a torque converter and in the fourth example the device is a measuring instrument.

The torque converter shown in Figure 1 comprises two shafts 11, 12 which carry two metal rotors 13, 14, and which are journalled in a stationary, generally cylindrical, housing 15 having a part 16 positioned between the two rotors 13, 14. The space 17 between the rotors 13, 14, and the clearance between the rotors 13, 14 and the housing 15 are filled with mercury. Two coils 18, 19 are mounted in annular grooves 21, 22 in the housing 15 and the construction and arrangement is such that the magnetic circuit of each of the two coils 18, 19 is linked with at least one rotor and with the stationary housing. The general direction of the main magnetic flux paths are indicated in Figure 1 by dashed lines.

However, the magnetic fluxes will not in general be limited to those main paths. For example the magnetic flux densities in each of the rotors and in the housing may, and probably are, due to the current in both coils. An essential feature of the arrangement is, however, that by varying the currents through the coils the flux densities in the rotors and in the housing may be varied.

When the coils 18, 19 are energised by passage of a current therethrough, rotation of the rotor 13 causes a current having a radial component to be induced therein and the construction of the converter is such that at least part of the induced current flows through the housing 15 to the rotor 14, radially through the rotor 14, and back to the rotor 13 through the mercury in the space 17. The path of this part of the induced current is indicated by chain lines in Figure 1. The radial component of current in the rotor 14 is at an angle (preferably a right angle) to the magnetic flux through that rotor. The magnetic flux linked with the rotor 14 is, as aforesaid, also linked with the housing. Consequently the passage of the induced current will tend to cause relative rotation between the housing and the rotor 14. The rotor 14 will therefore, be caused to rotate. Ideally the ratio of the angular velocities of the rotors 13, 14 will at all times be equal to the ratio of the magnetic fluxes passing through the rotors.

By varying the flux linked with either or both the rotors 13, 14 the velocity ratio of the converter may be varied and consequently the output torque may be varied for a fixed input torque. The flux linked with either or both the rotors 13, 14 may conveniently be varied by varying the current flowing in the coils 18, 19. Further, by varying the direction of the flux linked with either of the rotors 13, 14, the rotor 14 would be driven in the reverse direction.

Many modifications may be made to the above described torque converter. For instance, the part 16 may be made continuous so that the space 17 is omitted. In this case the part 16 will include axial insulating inserts.

The housing 18 may be divdied into two parts, for instance, along the plane x—x. In this case the two parts would be connected by electrical conductors suitable for permitting current flow between the two parts. The two parts can therefore, within limits, be situated at any required distance from one another. Further, the angle between the shafts 11, 12 can be made to have any desired value. Further the housing 15 can be modified so that the two shafts 11 and 12 are at an angle to one another.

The rotors 13, 14 and the housing 15 can conveniently comprise alternate layers of relatively high permeability and relatively high electrical conductivity materials, the boundaries between the layers being solely or partly in planes which include the shaft axis or axes.

The converter may comprise any number of parts. For example more than one input rotor may be provided, the component currents induced in the input rotors passing through the output rotor. More than one output rotor may be provided.

As aforesaid in Figure 1 the main current path has been indicated by a chain line. However, all the induced current will probably not follow this main path. In the example described with reference to Figure 1 parts of the surfaces of the rotors and of the housing are coated with insulating material to prevent unwanted current flow. The extent of the insulating material is indicated by 23. Alternative means may be employed to minimise unwanted current flow.

Unwanted current flow will tend to occur through the conducting fluid and various means may be employed to limit such current flow through the fluid in directions other than the preferred directions. A preferred way of achieving this is by making the clearances between the radial faces of the rotors, and between those faces and the housing, as small as possible so that the resistance of the unwanted current path is increased. The annuli of mercury between the rotors and the housing are preferably made to rotate as nearly as possible at the speed of rotation of the rotors.

The conducting fluid may be replaced, or partially replaced by solid brushes bearing on parts of the surfaces of the rotors or by small granular particles of a suitable material, e.g. carbon. Other conducting fluid may be employed e.g. liquid sodium.

The fluxes linked with the rotors need not be produced by two separate coils, although this arrangement is preferred. For example, a single exciting coil can be positioned between the two rotors. The exciting coils can if desired, be replaced, assisted or opposed by permanent magnets. Thus, Figure 1a shows the coil 19 replaced by a permanent magnet 19a.

A device in accordance with the invention may be employed for transmitting linear motion. By way of example the construction of a linear converter will be described. The linear converter would, in section, appear similar to Figure 1 and is shown in Figure 1b. The parts 13', 14' of the linear converter corresponding to the rotors 13, 14 would have the same cross-section for a certain distance in a direction perpendicular to the plane of the diagram and the shafts will be replaced by other suitable connections. Conductors 15' are embedded in the housing 15 as described in detail with reference to Figures 4 and 5.

As the part 13' of the linear converter corresponding to the part 13 moves perpendicularly to the plane of the drawing, the part 14' of the linear converter corresponding to the rotor 14 will be caused to move in a direction perpendicular to the drawing such that the ratio of their linear velocities is equal to the inverse ratio of the magnetic fluxes linking them.

The construction and arrangement of the exciting coils 18', 19' is such that all or part of the linear parts 13, 14 remain linked with the fluxes during this movement. Continual motion over a long period of time is generally only possible for a reciprocating motion, in which case the parts of the converter would be modified according to well-known methods to minimise eddy currents.

A device in accordance with the invention may also be employed for converting a torque input to a linear output. By way of example a rotary/linear device will be described. The rotary/linear device would, in section, appear similar to Figure 1 as shown in Figure 1c. The part 14" corresponding to the rotor 14 would be of the same cross-section for a certain distance in a direction perpendicular to the plane of the drawing and its shaft would be replaced by other suitable connections. Conductors 16' are embedded in the housing 15 as described in detail with reference to Figures 4 and 5.

In the torque converter described with reference to Figure 1, the main current path is of toroidal shape. Consequently the induced current produces a magnetomotive force having a circumferential direction, and under certain circumstances, e.g. if the induced current is relatively large, this magnetomotive force may be great enough to effect the magnetic circuits of the coils 18, 19, and thus affect the operation of the converter. We have found that the effect of the circumferential magnetomotive force can be minimised by increasing the reluctance of the magnetic circuits associated with the induced current in a circumferential direction.

The construction of a torque converter shown in Figures 2 and 3 is such that the magnetic circuit associated with the induced current has a relatively low reluctance.

The converter shown in Figures 2 and 3 comprises two short cylindrical rotors 31, 32 carried respectively by two co-axially aligned shafts 33, 34 rotatably mounted in a housing 35. Each of the rotors 31, 32 is solid except for a cut-away central portion which permits nuts 36 to be threaded on to the ends of the shafts 33, 34. The housing 35 comprises two end portions 37, 38 interconnected by a cylindrical central portion 39. The shafts 33, 34 are supported in roller bearings 41 in the end portions 37, 38 of the housing 35. One or more radial slots 42 are formed in the rotors and copper inserts 43 placed therein. The slots and inserts 42, 43 extend for the total axial thickness of the rotors.

The central portion 39 of the housing 35 comprises two inter-fitting annular parts 44, 45 each of generally T-shaped cross-section. The part 44 comprises a continuous outer annular portion 46 and a narrower inner annular portion 47. The portion 47 is cut away at regular intervals so that it is of castellated form, the cut-away portions 50 being of rectangular shape. The part 45 is formed of copper and comprises an inner annular portion 51 and a narrower outer annular portion 52, the portions 51, 52 having cut-away portions to receive the portions 47 of the part 44. The cut-away portions of the parts 44, 45 are such that these parts inter-fit to form a solid annulus of H-shaped cross-section. Energising coils 48 are wound in the annular grooves of the solid annulus.

The housing 35 is filled with a conducting fluid, e.g. mercury, suitable seals 53 being provided between the shafts 33, 34 and the end portions 37, 38 of the housing 35, and between the central and end portions 39, 37, 38 of the housing 35.

The outer radial surfaces 54 of the rotors and the opposed faces 55 of the housing are coated with insulation. An annular portion 56 of the inner surface of the housing and aligned corresponding portions 57 of the rotors are also insulated as are portions 60 of the shafts.

The operation of the foregoing example is similar to that of the converter described with reference to Figure 1. When the coils 48 are energised their respective magnetic circuits are linked with at least one rotor and with the housing. If now the rotor 31 is caused to rotate, a partial radial current will be induced therein. This current will pass through the rotor 32 and consequently that rotor will be caused to rotate, the reaction occurring on the housing.

The torque converter shown in Figures 4 and 5 is a preferred construction. In this construction the converter comprises an input rotor 61 and an output rotor 62 arranged coaxially, each rotor comprising a hub portion 63, 64 and an annular outer portion 65, 66. Each portion 65, 66 is provided with three equally-spaced axially-extending bores 67 which are plugged at each end and is secured respectively to a stepped shaft 68, 69. Portions of the shafts 68, 69 are splined to receive respectively a tubular flange driven member 71 and a tubular driving flange member 72. The opposite ends of the shafts 68, 69 are threaded to receive nuts 73 which secure the flange members to the shafts. The shafts 68, 69 are each supported in two roller thrust bearings 74 mounted in end caps 75 of a housing 76 containing the rotors. Oil seals 77 are provided separating the flange members 71, 72 to prevent the egress of lubricant from the bearings.

The housing 76 comprises the two end caps 75, two intermediate plates 78 and an annular central portion 79 bolted together by bolts 81. The housing is supported by two vertical side plates 82 secured to a horizontal base plate 83.

The central portion 79 of the housing 76 is provided with two annular grooves 84 in its side faces which receive electrically-conducting coils 85. The construction and arrangement of the converter is such that the magnetic circuit of each coil is linked with at least one rotor and with the housing. The central portion 79 is also provided with a multiplicity of bores 86 which receive copper rods 87 to provide an electric circuit between the rotors of low resistance. The opposite ends of the copper rods 87 are mounted in annular, rectangular sectioned rings 88 which are secured to the housing 76.

The rotors 61, 62 and the housing 76 are constructed so that there are small clearances between the peripheral surfaces of the rotors 61, 62 and the inner surface of the central portion 79 of the housing 76, between the outer radial faces of the outer portions 65, 66 of the rotors and the intermediate plates 78 of the housing, and between the adjacent faces of the rotors 61, 62. The clearances in this particular example are approximately 0.002 inch and are filled with mercury. The outer radial surfaces of the outer portions of the rotors and portions of the peripheral surfaces of the rotor are coated with a suitable film or layer of insulating material (e.g. varnish). The insulation is indicated by reference numeral 91.

In operation of the torque converter the input torque is applied to the rotor 61 and the coils 85 energised. When the coils 85 are energised a magnetic flux is linked with each of the rotors 61, 62 and with the housing 76. Due to the rotation of the rotor 61, that rotor cuts the magnetic flux linked therewith and, consequently, a current is induced therein. At least a portion of the induced current will flow through the mercury between the rotor 61 and the housing 76, to the housing, through the housing, through the mercury between the housing and the rotor 62, through that rotor and back to the rotor 61 through the mercury between the rotors. The current through the rotor 62 has at least a component at right-angles to the magnetic flux through that rotor and, consequently, the rotor 62 is caused to rotate. Again the necessary reaction is on the housing.

The example described with reference to Figures 4 and 5 may be made self-exciting by skewing the copper rods 87. Figure 4a illustrates the rings 88 interconnected by skewed copper rods 87a. The converter is then "series" self-exciting.

Two or more torque converters, as aforesaid, may be coupled in tandem or series so that the output from one supplies the input to the next. The convertors may conveniently be geared together.

Additional current from a suitable source e.g. a battery or accumulator, may be supplied to the output rotor to increase the current flowing therein. For instance, if the torque converter is to transmit power from an internal combustion engine, the engine may be started by passing such an additional current through the normal output rotor, whereupon the normal input rotor will be driven consequently driving the engine and starting it. Power is then transmitted from the engine in the normal direction.

Our invention may be applied to uses other than torque converters. For example, our invention may be applied to the field of instrumentation.

A measuring instrument is shown in Figure 6. The instrument comprises an input rotor 101 and an output rotor 102 arranged co-axially and secured respectively to input and output shafts 103, 104. The shafts 103, 104 are journalled through bearing sleeves 105, 106 mounted in end plates 107 of a generally cylindrical housing 108 containing the rotors. The housing 108 also comprises two similar annular, L-sectioned parts 109 secured to the end plates 107 to provide annular grooves 110 and are spaced by an annular spacer ring 111 formed of non-magnetic material. The parts 109 and the ring 111 are secured together by a series of copper rivets 112 which provide a current path of a high conductivity between the parts 109. A cylindrical copper block 113 is mounted within the housing and has a portion of reduced diameter which projects into a counterbore in the rotor 102. The block 113 provides a bearing seat for a projection 114 on the rotor 101. Two annular copper washers 115 are fitted within the grooves 110 and two coils 120 are positioned within the washers 115. The outer radial faces of the rotors 101, 102 and the adjacent faces of the housing, and a part of the inner peripheral surface of the housing are coated with a layer of insulation, as indicated at 116. The housing 108 is provided with two projecting arms 117 which are inter-connected by plate 118. The shaft 104 projects through the plate 118 and the projecting portion of the shaft is provided with a pointer 119 movable over a scale. One end of a spiral spring 121 is secured to the plate 118 and the other end of the spring is secured to the shaft 104, the spring forming a coil in a plane at right angles to the axis of the shaft.

The instruments operate in substantially the same way as the converters hereinbefore described. When the coils 120 are energised and the rotor 101 rotated, a current will be induced therein and at least a part of that induced current will flow radially through the rotor 102. The radial current will be at an angle to the magnetic flux linked with the rotor 102 and consequently the rotor 102 will be caused to rotate. This rotational movement will be opposed by the tension of the spring and the rotor will take up a static condition in which the return force due to the spring balances the force due to the current. The pointer will then indicate a value on the scale which may be read-off.

The above described instrument may be adapted for many uses. For instance, if the input rotor 101 is driven at a constant speed it may be shown that the deflection or rotation of the output rotor 102 against the spring bias will be proportional to the product of the energising currents flowing in the coils 120. This current could be measured and the instrument used as a measuring instrument therefor e.g. as a voltmeter, an ammeter or wattmeter. Alternatively if the energising currents in the coils 120 are maintained constant, it may be shown that the deflection or rotation of the output rotor 102 against its spring bias is proportional to the speed of rotation of the rotor 101. Thus the speed of rotation of the rotor 101 may be measured and the converter used as a tachometer. The instrument therefore provides a direct current, commutatorless, tachometer, which will operate in both directions of rotations.

Consider the input rotor 101 driven at a constant speed, then (1) If both the coils 120 carry a current proportional to an instantaneous voltage to be measured, then the pointer deflection will be proportional to the mean square voltage.

(2) If both the coils 120 carry a current proportional to an instantaneous current to be measured, then the pointer deflection will be proportional to the mean square current.

(3) If one of the coils 120 carries a current proportional to an instantaneous voltage in a system or circuit, and the other coil carries a current proportional to the instantaneous current in that system or circuit, then the pointer deflection will be proportional to the average power in that system or circuit.

(4) If one of the coils 120 carries a constant current then the deflection of the pointer will be proportional to the average value of the current in the other coil.

An instrument as described above has the advantage that the scale can be relatively long, possibly to extend over several full revolutions.

The provision of the non-magnetic spacer ring 111 enables the magnetic circuits associated with the input and output rotors to be isolated from one another. This is considered desirable in some constructions. The cup-shape of the output rotor 102 has been selected to reduce the weight of that rotor to a minimum but this shape is not essential. In this particular example mercury is permitted to fill the space between the washers 115 and the parts 109 to reduce the resistance of the main current path of the induced current. The copper block 113 divides the mercury into two hydro-dynamically separate parts.

The above described measuring instrument is designed for direct current measurement but can be modified in accordance with well-known principles to adapt it for alternating current measurement. For example, for alternating current measurement the majority of the parts would be of laminated construction.

We claim:

1. A transmission mechanism or like device comprising in combination, a first member to be driven by the input to the device when in use, a second member to provide the output from the device, said first and second members having closely adjacent parallel surfaces, a housing containing said two members and formed of a material having a high permeability, means for producing a magnetic flux through at least parts of the said first member and the housing so that when that member is driven an electric current is induced therein, a first conducting element embedded in the housing in alignment with said first member, means for making an electrical connection between said first member and said first element, a second conducting element embedded in the housing in alignment with said second member, a plurality of conductors embedded in the housing and interconnecting the first and second conducting elements, means for making an electrical connection between said second conducting element and said second member, means for making an electrical connection between said first and second members, insulating means for preventing current flow between the conductors and the first and second members through the housing, said insulating means comprising an uninterrupted layer of insulating material covering the inner surface of the housing extending continuously between the said first and second conducting elements and surrounding a portion of each of the said first and second members immediately adjacent said parallel surfaces of said members, and means for producing a second magnetic flux through at least parts of the said second member and the housing.

2. A transmission mechanism or like device comprising in combination, a first member to be driven by the input to the device when in use, a second member to provide the output from the device, said first and second members having closely adjacent parallel surfaces, a housing containing said two members and formed of a material having a high permeability, means for producing a magnetic flux through at least parts of the said first member and the housing so that when that member is driven an electric current is induced therein, a first conducting element embedded in the housing in alignment with said first member and having a surface parallel to a second surface of the first member, said surface on said first element being of less width than the said second surface on said first member and being spaced away from the plane of said first mentioned surface of said first member, means for making an electrical connection between said two surfaces, a second conducting element embedded in the housing in alignment with said second member and having a surface parallel to a surface of the second member, said surface on said second element being of less width than said surface on said second member and being spaced away from the plane of said first mentioned surface of said second member, means for making an electrical connection between said first member and said first element, a second conducting element embedded in the housing in alignment with said second member, a plurality of conductors embedded in the housing and interconnecting the first and second conducting elements, means for making an electrical connection between said second conducting element and said second member, means for making an electrical connection between said first and second members, insulating means for preventing current flow between the conductors and the first and second members through the housing, said insulating means comprising an uninterrupted layer of insulating material covering the inner surface of the housing and extending continuously between the said first and second conducting elements so as to extend between and beyond said parallel surfaces of the said first and second members, and means for producing a second magnetic flux through at least parts of the said second member and the housing.

3. A transmission mechanism or like device comprising in combination, a stationary housing of cylindrical internal shape and formed of a material having a high permeability, a cylindrical rotor to be driven by the input to the device when in use, a second cylindrical rotor to provide the output from the device, said first and second rotors being mounted co-axially in side-by-side relationship in the housing to run with a small peripheral clearance therein, means for producing a magnetic flux through at least parts of the input rotor and the housing, two rings formed of electrically conducting material and embedded in the housing to surround respectively the two rotors, said rings being of less axial thickness than the axial thickness of the rotors and respectively being spaced away from the adjacent surfaces of the rotors, a multiplicity of bars formed of electrically conducting material interconnecting the two rings and embedded in the housing, means for making respective electrical connections between said two rings and the said input and output rotors, insulating means for preventing current flow between the conductors and the first and second rotors through the housing, said insulating means including an uninterrupted layer of insulating material covering the inner surface of the housing and extending continuously between the two rings so as to extend between and beyond said adjacent surfaces of the rotors, and means for producing a second magnetic flux through at least parts of the output rotor and the said housing.

4. A transmission mechanism or like device comprising in combination, a stationary housing of cylindrical internal shape and formed of a material having a high permeability, a cylindrical rotor to be driven by the input to the device when in use, a second cylindrical rotor to provide the output from the device, said first and second rotors being mounted co-axially in side-by-side relationship in the housing to run with a small peripheral clearance therein, means for producing a magnetic flux through at least parts of the input rotor and the housing, two rings formed of electrically conducting material and embedded in the housing to surround respectively the two rotors, said rings being of less axial thickness than the axial thickness of the rotors and respectively being spaced away from the adjacent surfaces of the rotors, a multiplicity of bars formed of electrically conducting material interconnecting the two rings and embedded in the housing, means for making respective electrical connections between said two rings and the said input and output rotors, insulating means for preventing current flow between the conductors and the first and second rotors through the housing, said insulating means including an uninterrupted layer of insulating material covering the inner surface of the housing and extending continuously between the two rings so as to extend between and beyond said adjacent surfaces of the rotors, and further uninterrupted layers of insulating material respectively covering the end portions of the inner surface of the housing, and means for producing a second magnetic flux through at least parts of the output rotor and the said housing.

5. A transmission mechanism or like device comprising in combination, a stationary housing of cylindrical internal shape and formed of a material having a high permeability, a cylindrical rotor formed of a material having a high permeability and having radially extending conducting elements embedded therein to be driven by the input to the device when in use, a second cylindrical rotor formed of a material having a high permeability and having radially extending conducting elements embedded therein to provide the output from the device, said first and second rotors being mounted co-axially in side-by-side relationship in the housing to run with a small peripheral clearance therein, means for producing a magnetic flux through at least parts of the input rotor and the housing, two rings formed of electrically conducting material and embedded in the housing to surround respectively the two rotors, said rings being of less axial thickness than the axial thickness of the rotors and respectively being spaced away from the adjacent surfaces of the rotors, a plurality of conductors interconnecting the two rings and embedded in the housing, means for making respective electrical connections between said two rings and the said input and output rotors and for making an electrical connection between said input and output rotors, insulating means for preventing current flow between the conductors and the first and second rotors through the housing including an uninterrupted layer of insulating material covering the inner surface of the housing and extending continuously between the two rings so as to extend between and beyond said adjacent surfaces of the rotors, and means for producing a second magnetic flux through at least parts of the output rotor and the said housing.

6. An transmission mechanism or like device comprising in combination, a stationary housing of cylindrical internal shape and formed of a material having a high permeability, a cylindrical rotor to be driven by the input to the device when in use, a second cylindrical rotor to provide the output from the device, said first and second rotors being mounted co-axially in side-by-side relationship in the housing to run with a small peripheral clearance therein, two rings formed of electrically conducting material and embedded in the housing to surround respectively the two rotors, said rings being of less axial thickness than the axial thickness of the rotors and respectively being spaced away from the adjacent surfaces of the rotors, a multiplicity of bars formed of electrically conducting material interconnecting the two rings and embedded in the housing, means for making respective electrical connections between said two rings and the said input and output rotors, insulating means for preventing current flow between the conductors and the first and second rotors through the housing, said insulating means including an uninterrupted layer of insulating material covering the inner surface of the housing and extending continuously between the two rings so as to extend between and beyond said adjacent surfaces of the rotors, and two electrical coils respectively encircling said conducting rings and for producing magnetic fluxes through at least parts of the input and output rotors and the housing, the axial thickness of said coils being equal to the axial thickness of said rings.

7. A transmission mechanism or like device comprising in combination, a stationary housing of cylindrical internal shape and formed of a material having a high permeability, a cylindrical rotor to be driven by the input to the device when in use, a second cylindrical rotor to provide the output from the device, said first and second rotors being mounted co-axially in side-by-side relationship in the housing to run with a small peripheral clearance therein, means for producing a magnetic flux through at least parts of the input rotor and the housing, two rings formed of electrically conducting material and embedded in the housing to surround respectively the two rotors, a multiplicity of bars formed of electrically conducting material interconnecting the two rings and embedded in the housing, which conductors are of helical longitudinal form, means for making respective electrical connections between said two rings and the said input and output rotors, insulating means for preventing current flow between the conductors and the first and second rotors through the housing, said insulating means comprising an uninterrupted layer of insulating material covering the inner surface of the housing and extending continuously between said rings, and means for producing a second magnetic flux through at least parts of the output rotor and the said housing.

References Cited in the file of this patent

UNITED STATES PATENTS

| | | |
|---|---|---|
| 338,169 | Forbes | Mar. 16, 1886 |
| 446,488 | Waring | Feb. 17, 1891 |
| 806,217 | Wait | Dec. 5, 1905 |
| 1,001,047 | Kleinschmidt | Aug. 22, 1911 |
| 1,184,224 | Breslauer | May 23, 1916 |
| 1,635,319 | Gill | July 12, 1927 |
| 1,791,978 | Sessions | Feb. 10, 1931 |
| 1,987,479 | Japolsky | Jan. 8, 1935 |
| 2,408,080 | Lloyd | Sept. 24, 1946 |
| 2,633,545 | Rieth | Mar. 31, 1953 |

FOREIGN PATENTS

| | | |
|---|---|---|
| 141,360 | Great Britain | July 7, 1921 |
| 413,026 | Great Britain | July 12, 1934 |

OTHER REFERENCES

Westinghouse Engineer, vol. 16, No. 2, March 1956, page 59.